United States Patent
Armstrong et al.

(10) Patent No.: US 10,244,778 B2
(45) Date of Patent: Apr. 2, 2019

(54) METHOD FOR MONITORING COOKING IN AN OVEN APPLIANCE

(71) Applicant: General Electric Company, Schenectady, NY (US)

(72) Inventors: James Lee Armstrong, Louisville, KY (US); Stanton Earl Weaver, Jr., Broadalbin, NY (US); Sabrina Marie Hannah, Louisville, KY (US); Nandini Nagraj, Clifton Park, NY (US); Manuel Alfredo Palacios, Clifton Park, NY (US)

(73) Assignee: Haier US Appliance Solutions, Inc., Wilmington, DE (US)

( * ) Notice: Subject to any disclaimer, the term of this patent is extended or adjusted under 35 U.S.C. 154(b) by 287 days.

(21) Appl. No.: 14/933,367

(22) Filed: Nov. 5, 2015

(65) Prior Publication Data

US 2017/0127700 A1    May 11, 2017

(51) Int. Cl.
    F24C 15/18    (2006.01)
    A23L 1/01     (2006.01)
    F24C 7/08     (2006.01)

(52) U.S. Cl.
    CPC .......... *A23L 1/0128* (2013.01); *F24C 7/085* (2013.01); *A23V 2002/00* (2013.01)

(58) Field of Classification Search
    None
    See application file for complete search history.

(56) References Cited

U.S. PATENT DOCUMENTS

| | | | |
|---|---|---|---|
| 4,463,238 A | 7/1984 | Tanabe | |
| 7,167,815 B2 | 1/2007 | Labreche et al. | |
| 8,043,642 B2 | 10/2011 | Schonemann | |
| 8,178,142 B2 | 5/2012 | Greiner et al. | |
| 8,618,450 B2 | 12/2013 | Sanna et al. | |
| 2002/0173296 A1* | 11/2002 | Nordman | H04L 29/06 455/414.1 |
| 2007/0241099 A1* | 10/2007 | Sanna | H05B 6/6458 219/506 |

(Continued)

FOREIGN PATENT DOCUMENTS

EP    1831608 B1    12/2011
JP    H 043812      1/1992

(Continued)

OTHER PUBLICATIONS

LDA NPL (http://www.saedsayad.com/lda.htm), 2012.*

*Primary Examiner* — Michele L Jacobson
*Assistant Examiner* — Preston Smith
(74) *Attorney, Agent, or Firm* — Dority & Manning, P.A.

(57) ABSTRACT

A method for monitoring cooking in an oven appliance includes drawing cooking vapors or gases from a cooking chamber to a fluid analysis assembly of the oven appliance during a gas or vapor analysis cooking cycle, determining a cooking status of the food item within the cooking chamber with the controller of the oven appliance based upon a response pattern of a plurality of fluid sensors of the fluid analysis assembly to the cooking vapors or gases during the gas or vapor analysis cooking cycle, and activating an alert with the controller of the oven appliance when the cooking status of the food item within the cooking chamber is a particular cooking status.

13 Claims, 6 Drawing Sheets

(56) References Cited

U.S. PATENT DOCUMENTS

2008/0264269 A1* 10/2008 Sterzel .................... F24C 7/08
99/331

FOREIGN PATENT DOCUMENTS

| JP | H 04148114 | 5/1992 |
| JP | H 0942730 | 2/1997 |
| JP | H 10137060 | 5/1998 |
| JP | H 11104012 | 4/1999 |

* cited by examiner

METHOD FOR MONITORING COOKING IN AN OVEN APPLIANCE

FIELD OF THE INVENTION

The present subject matter relates generally to oven appliances and food doneness sensors for oven appliances.

BACKGROUND OF THE INVENTION

Oven appliances generally include a cabinet and heating elements. The heating elements are positioned adjacent a cooking chamber in the cabinet and are operable to heat the cooking chamber. During operation of the heating elements, food items within the cooking chamber may be cooked.

Recipes commonly call for food items to be cooked for a predetermined period of time at a specified temperature. Heating the food items at the specified temperature for the predetermined period of time generally cooks the food item to a desired degree. However, ingredient variations, oven cooking temperature variations and other factors affect each recipe batch and make obtaining uniform cooking results difficult. Thus, selecting the specified temperature and cooking the food item for the predetermined period of time may not provide the desired degree of cooking for each recipe batch.

Accordingly, a method for monitoring cooking in an oven appliance that assists with determining when a food item within the oven appliance is cooked would be useful. In particular, a method for operating an oven appliance that assists with determining when a food item is cooked to a desired degree would be useful.

BRIEF DESCRIPTION OF THE INVENTION

The present subject matter provides a method for monitoring cooking in an oven appliance that includes drawing cooking vapors or gases from a cooking chamber to a fluid analysis assembly of the oven appliance during a gas or vapor analysis cooking cycle, determining a cooking status of the food item within the cooking chamber with the controller of the oven appliance based upon a response pattern of a plurality of fluid sensors of the fluid analysis assembly to the cooking vapors or gases during the gas or vapor analysis cooking cycle, and activating an alert with the controller of the oven appliance when the cooking status of the food item within the cooking chamber is a particular cooking status. Additional aspects and advantages of the invention will be set forth in part in the following description, or may be apparent from the description, or may be learned through practice of the invention.

In a first exemplary embodiment, a method for monitoring cooking in an oven appliance is provided. The method includes receiving a food item indication at a controller of the oven appliance and heating a food item within a cooking chamber of the oven appliance. The food item indication corresponds to a type of the food article within the cooking chamber. The method also includes drawing cooking vapors or gases from the cooking chamber to a fluid analysis assembly of the oven appliance, determining a cooking status of the food item within the cooking chamber with the controller of the oven appliance based upon a response pattern of a plurality of fluid sensors of the fluid analysis assembly to the cooking vapors or gases, and activating an alert with the controller of the oven appliance when the cooking status of the food item within the cooking chamber is a done cooking status.

In a second exemplary embodiment, a method for monitoring cooking in an oven appliance is provided. The method includes initiating a gas or vapor analysis cooking cycle of the oven appliance, operating a heating element of the oven appliance in order to preheat a cooking chamber of the oven appliance to a selected cooking temperature during the gas or vapor analysis cooking cycle, activating a food item placement request with the controller of the oven appliance after the cooking chamber of the oven appliance is preheated to the selected cooking temperature, drawing cooking vapors or gases from the cooking chamber to a fluid analysis assembly of the oven appliance after a food item is positioned within the cooking chamber during the gas or vapor analysis cooking cycle, determining a cooking status of the food item within the cooking chamber with the controller of the oven appliance based upon a response pattern of a plurality of fluid sensors of the fluid analysis assembly to the cooking vapors or gases during the gas or vapor analysis cooking cycle, and activating an alert with the controller of the oven appliance when the cooking status of the food item within the cooking chamber is a selected cooking status.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures.

DETAILED DESCRIPTION

Figure 1:
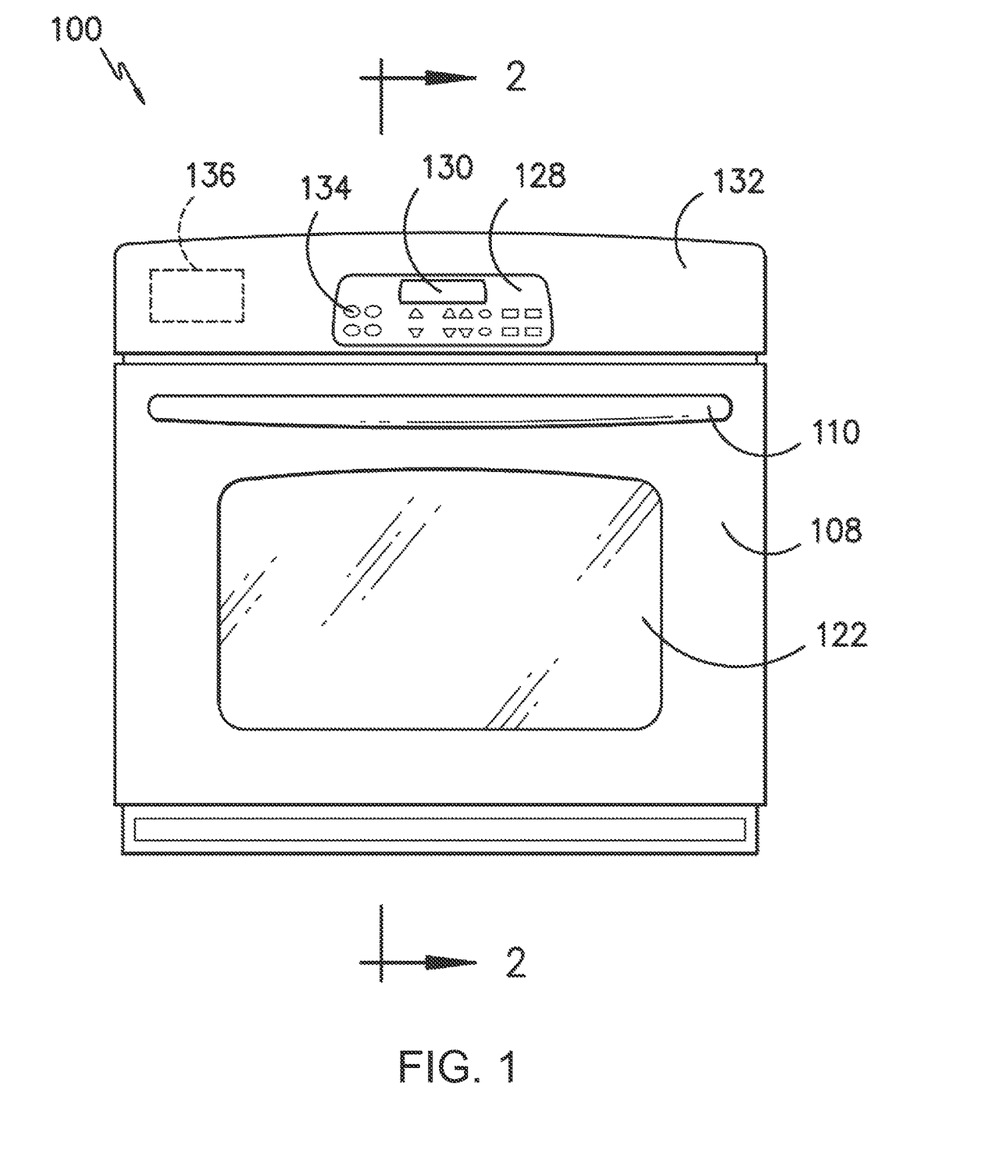
FIG. 1 provides a front view of an oven appliance according to an exemplary embodiment of the present subject matter.
Figure 2:
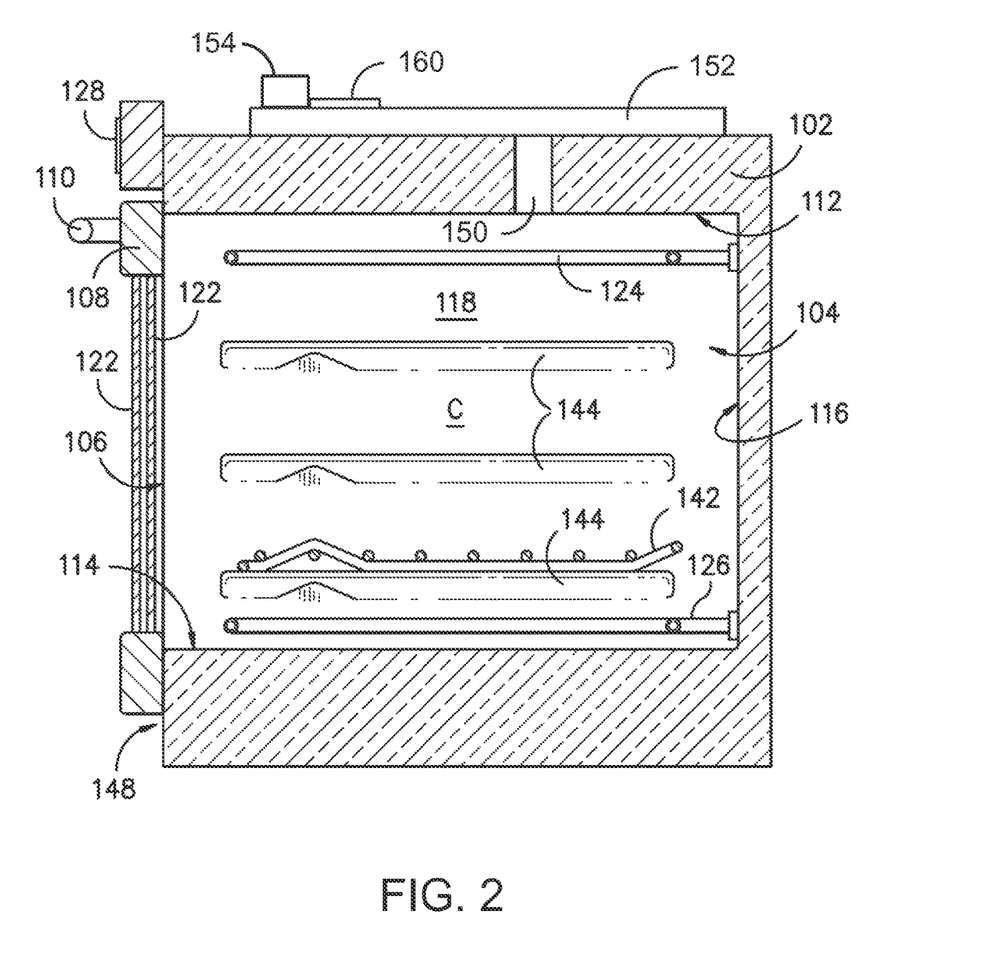
FIG. 2 provides a section view of the exemplary oven appliance of FIG. 1 taken along the 2-2 line of FIG. 1.

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

FIG. 1 provides a front view of an oven appliance 100 according to an exemplary embodiment of the present subject matter. FIG. 2 provides a section view of oven appliance 100. Referring to FIGS. 1 and 2, oven appliance 100 includes an insulated cabinet 102 with an interior cooking chamber 104 defined by a top wall 112, a bottom wall 114, a back wall 116 and opposing side walls 118, 120. Cooking chamber 104 is configured for the receipt of one or more food items to be cooked, e.g., baked, broiled, etc. Oven appliance 100 includes a door 108 pivotally mounted, e.g., with one or more hinges (not shown), to cabinet 102 at the opening 106 of cabinet 102 to permit selective access to cooking chamber 104 through opening 106. A handle 110 is mounted to door 108 and assists a user with opening and closing door 108. For example, a user can pull on handle 110 to open or close door 108 and access cooking chamber 104.

Oven appliance 100 can include a seal (not shown) between door 108 and cabinet 102 that assists with maintaining heat and cooking gases or vapors within cooking chamber 104 when door 108 is closed as shown in FIGS. 1 and 2. Multiple parallel glass panes 122 provide for viewing the contents of cooking chamber 104 when door 108 is closed and assist with insulating cooking chamber 104. A baking rack 142 is positioned in cooking chamber 104 for the receipt of food items or utensils containing food items. Baking rack 142 is slidably received onto embossed ribs or sliding rails 144 such that rack 142 may be conveniently moved into and out of cooking chamber 104 when door 108 is open.

A heating element at the top, bottom or both of cooking chamber 104 provides heat to cooking chamber 104 for cooking or other operations of oven appliance 100. Such heating element(s) can be gas, electric or a combination thereof. For example, in the embodiment shown in FIG. 2, oven appliance 100 includes a top heating element 124 and a bottom heating element 126, and top and bottom heating elements 124, 126 are electric heating elements, e.g., calrods.

Oven appliance 100 includes a user interface 128 having a display 130 positioned on an interface panel 132 and having a variety of controls 134. User interface 128 allows the user to select various options for the operation of oven 100 including, e.g., temperature, time, and/or various cooking and cleaning cycles. Operation of oven appliance 100 is regulated by a controller 136 that is operatively coupled, i.e., in communication with, user interface 128, heating elements 124, 126, and other components of oven 100 as will be further described. For example, in response to user manipulation of the user interface 128, controller 136 can operate the heating element(s). Controller 136 can receive measurements from a temperature sensor (not shown) placed in cooking chamber 104 and, e.g., provide a temperature indication to the user with display 130. Controller 136 can also be provided with other features as will be further described herein. User interface 128 may also be an automated interface, such as a scanning device or a mobile device that can connect and communicate with oven appliance 100, e.g., wirelessly.

Controller 136 may include a memory and one or more processing devices such as microprocessors, CPUs, or the like, such as general or special purpose microprocessors operable to execute programming instructions or microcontrol code associated with operation of oven appliance 100. The memory may represent random access memory such as DRAM or read only memory such as ROM or FLASH. In one embodiment, the processor executes programming instructions stored in memory. The memory may be a separate component from the processor or may be included onboard within the processor.

Controller 136 may be positioned in a variety of locations throughout oven appliance 100. In the illustrated exemplary embodiment, controller 136 is located next to user interface 128 within interface panel 132. In other exemplary embodiments, controller 136 may be located under or next to the user interface 128 otherwise within interface panel 132 or at any other appropriate location with respect to oven appliance 100. In the exemplary embodiment illustrated in FIG. 1, input/output ("I/O") signals are routed between controller 136 and various operational components of oven appliance 100 such as heating elements 124, 126, controls 134, display 130, sensors, alarms and/or other components as may be provided. In one exemplary embodiment, user interface 128 may represent a general purpose I/O ("GPIO") device or functional block.

Although shown with touch type controls 134, it should be understood that controls 134 and the configuration of oven appliance 100 shown in FIG. 1 is provided by way of example only. More specifically, user interface 128 may include various input components, such as one or more of a variety of electrical, mechanical, or electro-mechanical input devices including rotary dials, push buttons and touch pads. The user interface 128 may include other display components, such as a digital or analog display device designed to provide operational feedback to a user. User interface 128 may be in communication with controller 136 via one or more signal lines or shared communication busses.

Oven appliance 100 is generally referred to as a "wall oven" and is provided by way of example only. Thus, while described in greater detail below in the context of oven appliance 100, it should be understood that the present subject matter described below in greater detail may be used in or with any other suitable oven appliance in alternative exemplary embodiments. For example, the present subject matter may also be used in or with stand-alone oven appliances, oven range appliances, etc.

Referring now to FIG. 2, oven appliance 100 includes a vent 150, e.g., in top wall 112 of cooking chamber 104. Vent 150 is in fluid communication with the exterior of cooking chamber 104 through duct 152. Thus, vent 150 and duct 152 form an exhaust for vapors and gases generated in cooking chamber 104, i.e., an exhaust for vapors and gases given off by food items in cooking chamber 104. Oven appliance 100 also includes a fan or air handler 154. Air handler 154 is configured for selectively drawing fluid (e.g., vapors and gases generated during cooking of a food article) in cooking chamber 104 into vent 150 and duct 152. Air handler 154 may be coupled to duct 152 within cabinet 102, e.g., above top wall 112.

Figure 3:
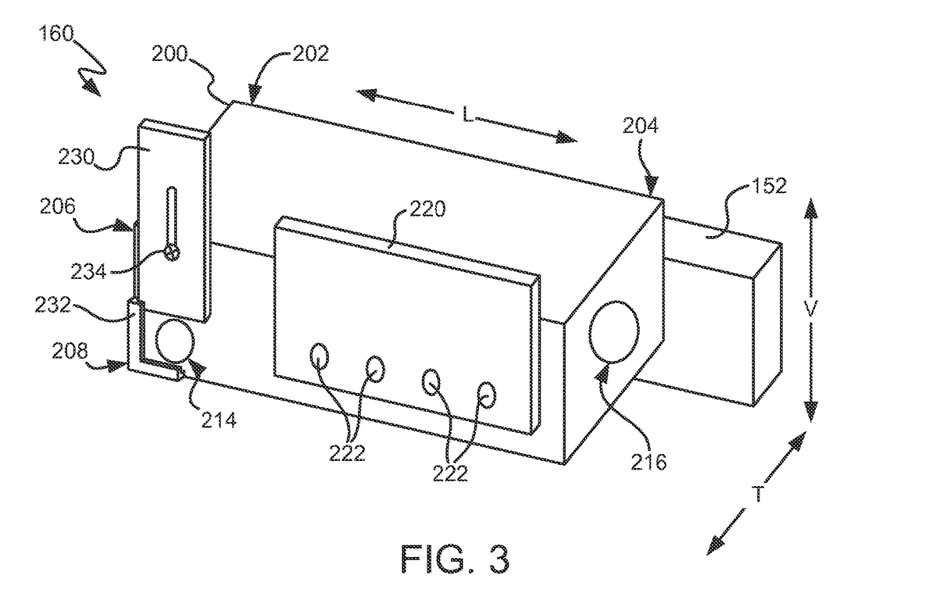
FIG. 3 provides a perspective view of a fluid analysis assembly according to an exemplary embodiment of the present subject matter.

As shown in FIG. 2, oven appliance 100 includes a fluid analysis assembly 160. Fluid analysis assembly 160 is positioned at and/or mounted to duct 152 within oven appliance 100. Thus, fluid analysis assembly 160 is fluidly coupled to duct 152 such that vapors and gases from cooking chamber 104 within duct 152 may flow to fluid analysis assembly 160. Fluid analysis assembly 160 may include a printed circuit board ("PCB") with a plurality of fluid sensors 222 (FIG. 3). The PCB of fluid analysis assembly 160 is electrically powered and may generate heat during operation. Thus, mounting fluid analysis assembly 160 (e.g., and the PCB) to duct 152 separates the PCB from heat generated in cooking chamber 104 during operation of top heating element 124 and/or bottom heating element 126 to assist with preventing damage to the PCB. It should be understood that vent 150 and fluid analysis assembly 160 may be positioned at other locations within oven appliance 100 in alternative exemplary embodiments. For example, fluid analysis assembly 160 and vent 150 may be positioned at or adjacent back wall 116 or one of opposing side walls 118, 120 in alternative exemplary embodiments.

Figure 4:
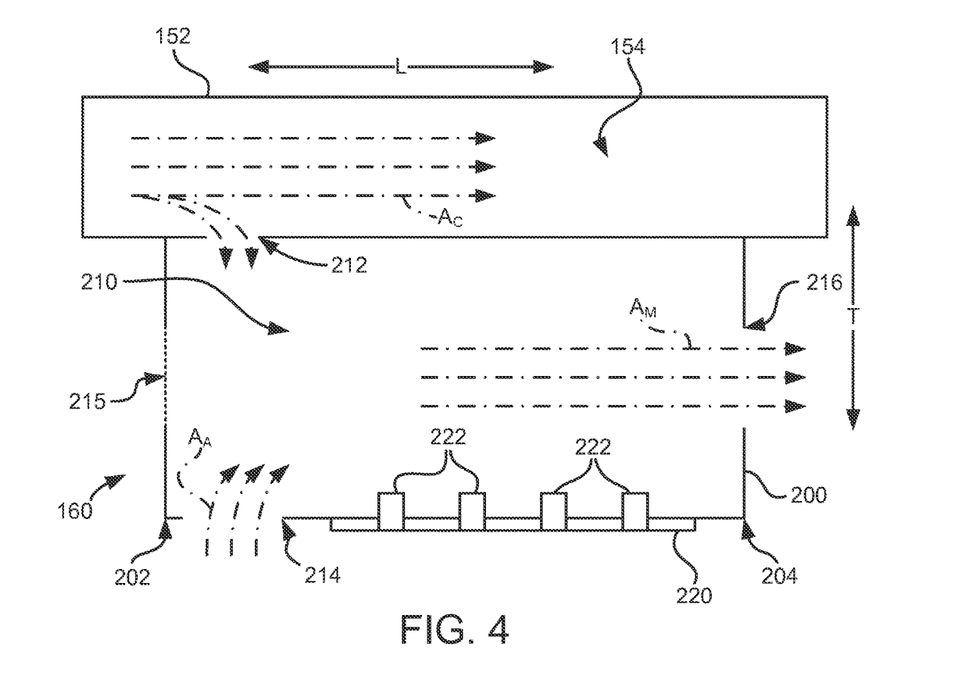
FIG. 4 provides a top section view of the exemplary fluid analysis assembly of FIG. 3.

FIG. 3 provides a perspective view of fluid analysis assembly 160. FIG. 4 provides a top section view of fluid analysis assembly 160. As may be seen in FIGS. 3 and 4, fluid analysis assembly 160 includes a dilution box or casing 200 and a sensor array 220. Fluid analysis assembly 160 defines a vertical direction V, a lateral direction L and a transverse direction T. The vertical direction V, the lateral direction L and the transverse direction T are mutually perpendicular and form an orthogonal direction system.

As may be seen in FIG. 4, casing 200 defines a dilution chamber 210, a fluid inlet 212, an ambient inlet 214 and a mixed fluid exit 216. Fluid inlet 212 is configured for directing cooking vapors or gases from cooking chamber 104 of oven appliance 100 within duct 152 (shown with arrows $A_C$) into dilution chamber 210. Conversely, ambient inlet 214 is configured for directing ambient air about fluid analysis assembly 160 (shown with arrows $A_A$), such as air within or around cabinet 102, into dilution chamber 210. Within dilution chamber 210, the ambient air $A_A$ may mix with the cooking vapors or gases $A_C$ from cooking chamber 104. The ambient air $A_A$ may mix with cooking vapors or gases $A_C$ within dilution chamber 210 in order to reduce a temperature of the cooking vapors or gases $A_C$ within dilution chamber 210 and/or provide a suitable concentration of cooking vapors or gases $A_C$ at sensor array 220 within dilution chamber 210. The ambient air $A_A$ may also act as a reference signal in certain exemplary embodiments.

Sensor array 220 is mounted to casing 200 and includes a plurality of fluid sensors 222. Fluid sensors 222 are positioned at or within dilution chamber 210 such that fluid sensors 222 are exposed to the mixture (shown with arrows $A_M$) of ambient air $A_A$ and cooking vapors or gases $A_C$ from cooking chamber 104 within dilution chamber 210. Fluid sensors 222 measure the level, e.g., the concentration, of an off-gas or several off-gases exhausting from a food item cooking within cooking chamber 104 via duct 152. The off-gases or vapors may include gases typically given off or emitted by cooking food items, such as water vapor, organic solvent vapors, inorganic vapors, organic-nonpolar vapors, organic polar vapors, amines, sulfur-containing compounds, etc. As a further example, the off-gases or vapors may include alcohols, inorganic acids, organic acids, aldehydes, heterocyclic compounds, pyrazines, thiazoles, etc. In alternative exemplary embodiments, fluid sensors 222 may measure additional or different gases. It should be understood that each fluid sensor of fluid sensors 222 may be configured or set to measure a different off-gas or vapor or combination of off-gases or vapors in a flow of fluid from cooking chamber 104. Thus, each fluid sensor of fluid sensors 222 may be different or configured differently. As discussed in greater detail below, measurements or signals from fluid sensors 222 may be used to determine when a food article within cooking chamber 104 is cooked.

In certain exemplary embodiments, fluid sensors 222 may be a metal oxide semiconductor ("MOS") sensors, which measure gas levels through changes in resistance when a voltage is applied to sensor array 220. Thus, the voltage readouts from fluid sensors 222 during operation of oven appliance 100 may be compared using, e.g., controller 136, an op-amp comparator, analog to digital converter or the like, to analyze or indicate changes in gas levels within cooking chamber 104. As an example, the voltage readouts from fluid sensors 222 during a cooking cycle may be compared or analyzed to detect a pattern within the voltage readouts from fluid sensors 222 and determine when a food article within cooking chamber 104 is cooked, as discussed in greater detail below. In alternative exemplary embodiments, fluid sensors 222 may be any sensor suitable for measuring off-gases, vapors or fumes generated in cooking chamber 104, such as a near infrared ("NIR") gas detector, radio frequency ("RF") sensor, optical sensor, multimodal sensor platform, electrochemical sensors, etc. Sensor array 220 may include any suitable number of fluid sensors 222. For example, fluid sensors 222 may include at least three or at least four fluid sensors each configured to measure or detect a different off-gas or combination of off-gases. Fluid sensors 222 may be spaced apart from each other, e.g., along the lateral direction L, on casing 200, as shown in FIGS. 3 and 4.

As may be seen in FIG. 4, fluid inlet 212 of casing 200 is contiguous with duct 152 and dilution chamber 210. Thus, fluid inlet 212 of casing 200 extends between duct 152 and dilution chamber 210 such that at least a portion of the fluid $A_C$ from cooking chamber 104 flows into dilution chamber 210 via fluid inlet 212, e.g., during operation of air handler 154. Ambient inlet 214 is contiguous with ambient air $A_A$ about casing 200 and dilution chamber 210. Thus, ambient air $A_A$ about casing 200 may flow into dilution chamber 210 via ambient inlet 214, e.g., during operation of air handler 154. Ambient inlet 214 may be larger than fluid inlet 212, in certain exemplary embodiments.

Fluid inlet 212 and ambient inlet 214 may be positioned opposite each other about dilution chamber 210, e.g., along the transverse direction T. Thus, fluid inlet 212 and ambient inlet 214 may be positioned on opposite sidewalls of casing 200 and be spaced apart from each other, e.g., along the transverse direction T, with dilution chamber 210 positioned between fluid inlet 212 and ambient inlet 214. In particular, fluid inlet 212 and ambient inlet 214 may be aligned with each other across dilution chamber 210, e.g., along the transverse direction T. Such positioning of fluid inlet 212 and ambient inlet 214 relative to each other and dilution chamber 210 may assist mixing of ambient air $A_A$ and cooking vapors or gases $A_C$ from cooking chamber 104 within dilution chamber 210. Ambient inlet 214 may be positioned at an alternate position 215 on a transverse side wall of casing 200 in alternative exemplary embodiments. Thus, e.g., ambient inlet 214 may be positioned opposite mixed fluid exit 216, e.g., along the lateral direction L, on casing 200 at dilution chamber 210.

Casing 200 extends between a first side portion 202 and a second side portion 204, e.g., along the lateral direction L. Fluid inlet 212 and ambient inlet 214 may be positioned at first side portion 202 of casing 200, and mixed fluid exit 216 may be positioned at second side portion 204 of casing 200. Thus, mixed fluid exit 216 may be spaced apart from fluid inlet 212 and/or ambient inlet 214, e.g., along the lateral direction L. Mixed fluid exit 216 may also be positioned between fluid inlet 212 and ambient inlet 214, e.g., along the transverse direction T. Such positioning of fluid inlet 212 and ambient inlet 214 relative to mixed fluid exit 216 may also assist mixing of ambient air $A_A$ and cooking vapors or gases $A_C$ from cooking chamber 104 within dilution chamber 210. Fluid sensors 222 may also be positioned between fluid inlet 212 and mixed fluid exit 216, e.g., along the lateral direction L.

Casing 200 also extends between a top portion 206 and a bottom portion 208, e.g., along the vertical direction V. Fluid inlet 212, ambient inlet 214 and/or mixed fluid exit 216 may be positioned at or adjacent bottom portion 208 of casing 200 in certain exemplary embodiments. Fluid sensors 222 may also be positioned at or adjacent bottom portion 208 of casing 200. In addition, at least a portion of fluid inlet 212, ambient inlet 214, mixed fluid exit 216 and/or fluid sensors 222 may be positioned coplanar with one another, e.g., in a plane that is perpendicular to the vertical direction V, in certain exemplary embodiments.

As shown in FIG. 3, fluid analysis assembly 160 includes a control valve 230. Control valve 230 is positioned at ambient inlet 214 of casing 200. Control valve 230 is configured for selectively adjusting a flow of ambient air $A_A$ into dilution chamber 210 via ambient inlet 214. Thus, in an open configuration (shown in FIG. 3), control valve 230 allows ambient air $A_A$ into dilution chamber 210 via ambient inlet 214. Conversely, control valve 230 blocks or limits ambient air $A_A$ from flowing into dilution chamber 210 via ambient inlet 214 in a closed configuration (not shown). Control valve 230 may be manually adjusted between the open and closed configuration. As another example, fluid analysis assembly 160 may include a motor or other suitable actuator coupled to control valve 230 and configured for adjusting control valve 230 between the open and closed configurations. Controller 134 may be operatively coupled to the motor or actuator of control valve 230 in order to selectively open and close the control valve 230 with the motor or actuator of control valve 230.

Control valve 230 may be any suitable mechanism for regulating the flow of ambient air $A_A$ into dilution chamber 210 via ambient inlet 214. For example, control valve 230 may be a plate slidably mounted to casing 200 at a channel 232 of casing 200, and a fastener 234 may selectively secure or lock the plate in one of the open or closed configurations. Control valve 230 may assist with regulating mixing of ambient air $A_A$ and cooking vapors or gases $A_C$ from cooking chamber 104 within dilution chamber 210, as discussed in greater detail below.

Fluid analysis assembly 160 is configured for receiving cooking vapors or gases $A_C$ from cooking chamber 104. Within dilution chamber 210, the cooking vapors or gases $A_C$ are mixed with ambient air $A_A$ and measured with fluid sensors 222. The gas level measured by fluid sensors 222 may be used to determine whether a food item cooking within oven appliance 100 is cooked or still cooking or at a specific stage of cooking doneness, such as light, medium, dark or burnt. For example, fluid sensors 222 may measure the level or concentration of the gases given off a food article within cooking chamber 104 when the food article is cooking within oven appliance 100. A pattern of the gas levels values from sensor array 220 may be utilized to establish when the food article is cooked and/or a degree to which the food article is cooked. Such features and operation of oven appliance 100 are discussed in greater detail below in the context of FIGS. 5 and 6.

Figure 5:
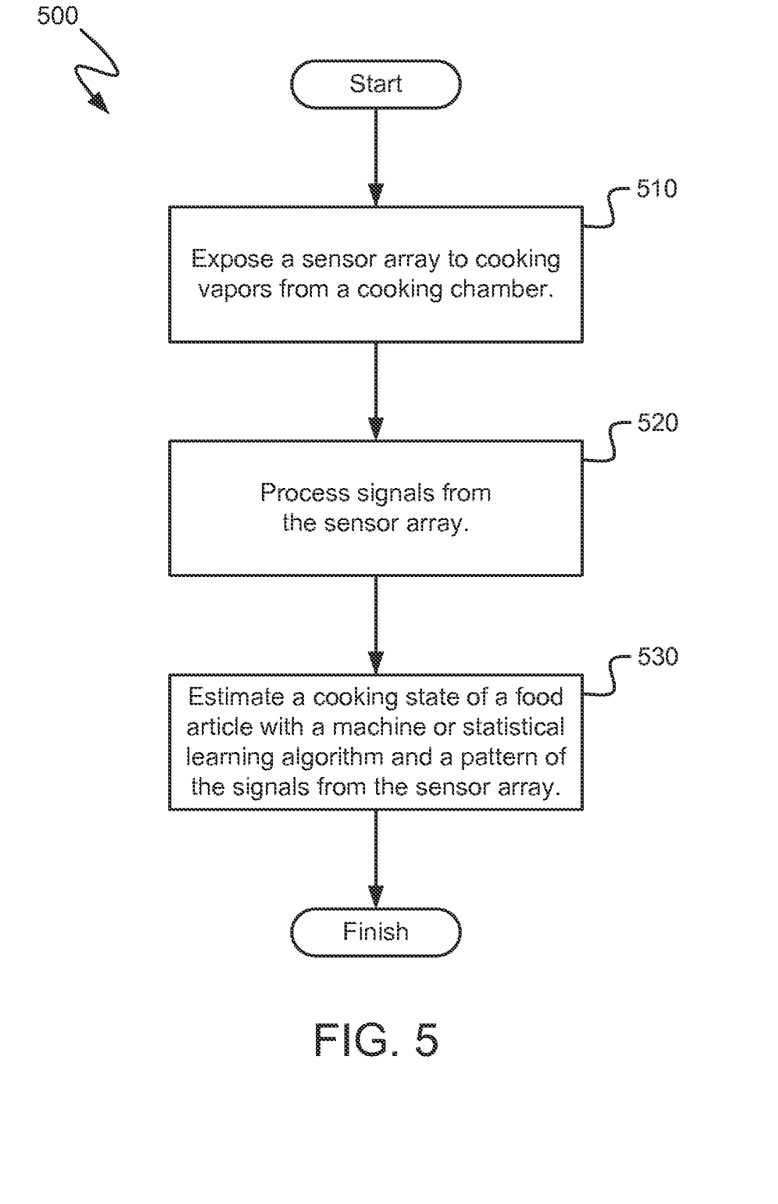
FIG. 5 illustrates a method for determining doneness of food items within an oven appliance according to an exemplary embodiment of the present subject matter.

FIG. 5 illustrates a method 500 for determining doneness of food items within an oven appliance according to an exemplary embodiment of the present subject matter. Method 500 may be used with any suitable oven appliance. For example, method 500 may be used with oven appliance 100 to determine doneness of a food item within cooking chamber 104 with fluid analysis assembly 160. Thus, method 500 is discussed in greater detail below in the context of oven appliance 100. Controller 136 of oven appliance 100 may be configured or programmed to implement method 500.

Prior to step 510, a user may select a cooking temperature for oven appliance 100, and controller 136 may active top heating element 124 and/or bottom heating element 126 to heat cooking chamber 104 to the selected cooking temperature. After the cooking chamber 104 is preheated, the user may place a food item within cooking chamber 104. Utilizing interface panel 132, the user may then activate a vapor or gas cooking cycle that is regulated or monitored with fluid analysis assembly 160 to determine when the food item within cooking chamber 104 is finished cooking. During the vapor or gas cooking cycle, controller 136 may activate air handler 154 to draw cooking vapors or gases $A_C$ from cooking chamber 104 to fluid analysis assembly 160.

Alternatively, the preheat cycle may be omitted and the user may place the food item to be cooked into cooking chamber 104. Utilizing interface panel 132, the user may then activate the vapor or gas cooking cycle that is regulated or monitored with fluid analysis assembly 160 to determine when the food item within cooking chamber 104 is finished cooking or at a desired degree of cooking doneness.

At step 510, sensor array 220 is exposed to a mixture $A_M$ of ambient air $A_A$ and cooking vapors or gases $A_C$ from cooking chamber 104 within dilution chamber 210. During step 510, each fluid sensor of fluid sensors 222 outputs a signal corresponding to the concentration of a respective off-gas or combination of off-gases within cooking vapors or gases $A_C$ from cooking chamber 104. Thus, sensor array 220 measures off-gases within cooking vapors or gases $A_C$ from cooking chamber 104 at step 510. It should be understood that data or measurements from sensor array 220 at step 510 may be multivariate.

At step 520, the signals from fluid sensors 222 are processed. For example, prior to carrying out a statistical modeling at step 530, the signals from fluid sensors 222 are pre-processed in order to "clean up" or otherwise improve the data or measurements from fluid sensors 222 regarding the relative concentration of a respective off-gas or combination of off-gases within cooking vapors or gases $A_C$ from cooking chamber 104. Step 520 may assist with reducing possible biases, increasing signal-to-noise ratio, etc. in order to improve performance of subsequent steps of method 500. Any suitable method or processing or a combination thereof may be performed on the signals from fluid sensors 222 at step 520. For example, the signals from fluid sensors 222 may be normalized, mean-centered, detrended, autoscaled, etc. at step 520.

At step 530, controller 134 utilizes the pre-processed signals from fluid sensors 222 and a machine or statistical learning algorithm(s) to determine a cooking status of the food item within cooking chamber 104. In particular, the machine or statistical learning algorithm or a combination thereof may be programmed into controller 136, and controller 136 may receive the processed signals from fluid sensors 222 and utilize the processed signals from fluid sensors 222 as inputs for the machine or statistical learning algorithm(s). The machine or statistical learning algorithm(s) may output or establish a response pattern of fluid sensors 222 based upon the inputted processed signals from fluid sensors 222. The response pattern of fluid sensors 222 may correspond to a chemical composition of the cooking vapors or gases $A_C$ from cooking chamber 104. Controller 136 may determine the cooking status of the food item within cooking chamber 104 at step 530 based upon the response pattern of fluid sensors 222 from the machine or statistical learning algorithm, e.g., independent of cooking time.

Figure 7:
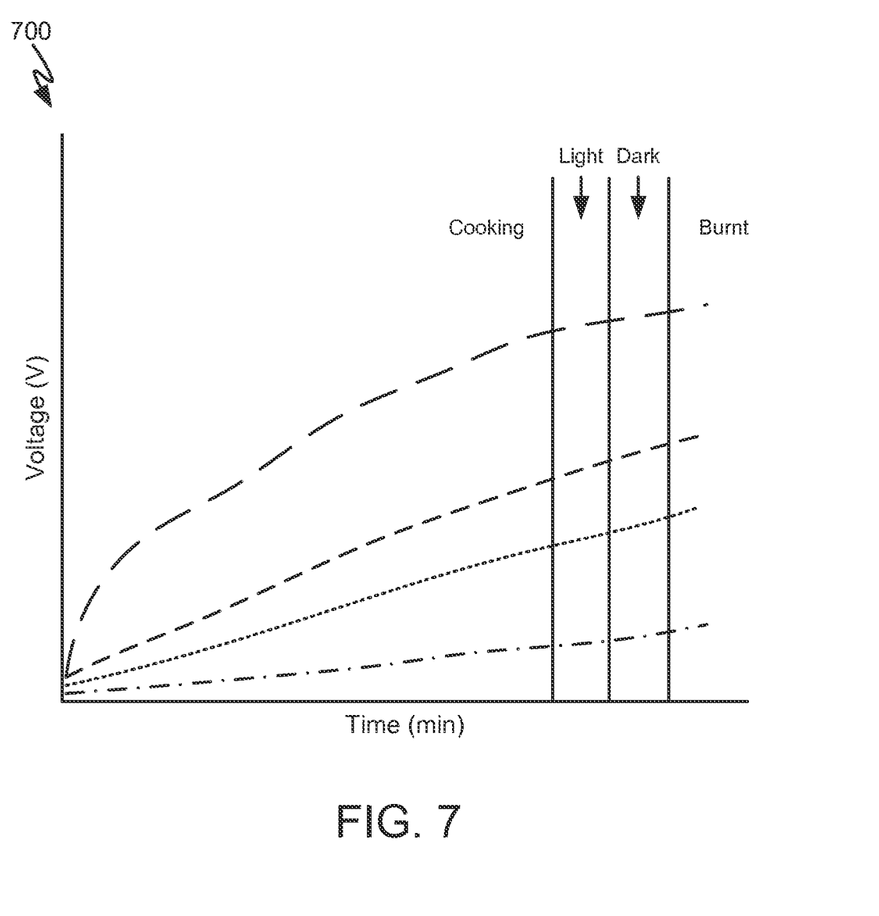
FIG. 7 is an exemplary plot of signals from a sensor array of a fluid analysis assembly during cooking of a food item.

An alert may be activated when the cooking status of the food item is done. For example, a customizable (e.g., user-defined) alert may be activated when the cooking status of the food item is a desired doneness level. The alert may also be activated to directly control parameters of oven appliance 100, such as lowering the set temperature of oven appliance 100 or turning off oven appliance 100. Thus, method 500 may notify the user when the food item is cooked. The cooking status may be a selected or desired cooking status, such as lightly cooked, browned, burned, etc. FIG. 7 is an exemplary plot 700 of signals from sensor array 220 during method 700. Each dashed line in the plot 700 of FIG. 7 corresponds to an output of signal from a respective one of fluid sensors 222. As shown in FIG. 7, the outputs of fluid sensors 222 increases over time during cooking of the food item within oven appliance 100. Based upon a pattern of the signals from fluid sensors 222, method 500 utilizes the machine or statistical learning algorithm to determine when the food item is "cooking," "light," "dark," "burnt," "rare," "medium rare," "medium," "medium well," "well," etc. Thus, the user may select whether method 500 alerts the user when the food item is lightly cooked, darkly cooked, burnt, etc.

Any suitable machine or statistical learning algorithm or combination of models may be provided at step 530 to assist with determining the cooking status of the food item within cooking chamber 104. For example, the machine or statistical learning model(s) may be a linear discriminant analysis model, a partial least squares discriminant analysis model, a support vector machine, a random tree model, a logistic regression model, a naïve Bayes classification model, a K-nearest neighbor classification model, a quadratic discriminant analysis model, an anomaly detection model, a boosted and bagged decision tree model, an artificial neural network model, a C4.5 model, a k-means model or a combination of two or more of the above listed models.

It should be understood that a balance between simplicity and robustness should be considered when selecting the machine or statistical learning algorithm(s) for step 530. For example, the machine or statistical learning algorithm may be saved within the memory of controller 136. As a particular example, a partial least square discriminant analysis model may provide a robust and simple linear method while also reducing risk of overfitting by reducing dimensional space. Calibration bias may also be avoided or limited by utilizing cross-validation routines along with a calibration set.

Method 500 may assist with determining doneness of food items during cooking and/or baking of the food items within an oven appliance. Utilizing method 500, a timer may be unnecessary to determine whether the food items have been cooked to a user desired degree of doneness. In particular, method 500 may monitor vapor group response patterns rather than individual vapor concentrations to determine doneness of food items during cooking and/or baking of the food items within the oven appliance. The response patterns are based on the chemical composition of the vapors generated during the cooking process. Thus, method 500 may discern cooking stages of the food items either in a cooking-time independent manner or using cooking time as a variable and without relying upon absolute cooking vapor concentrations.

Figure 6:
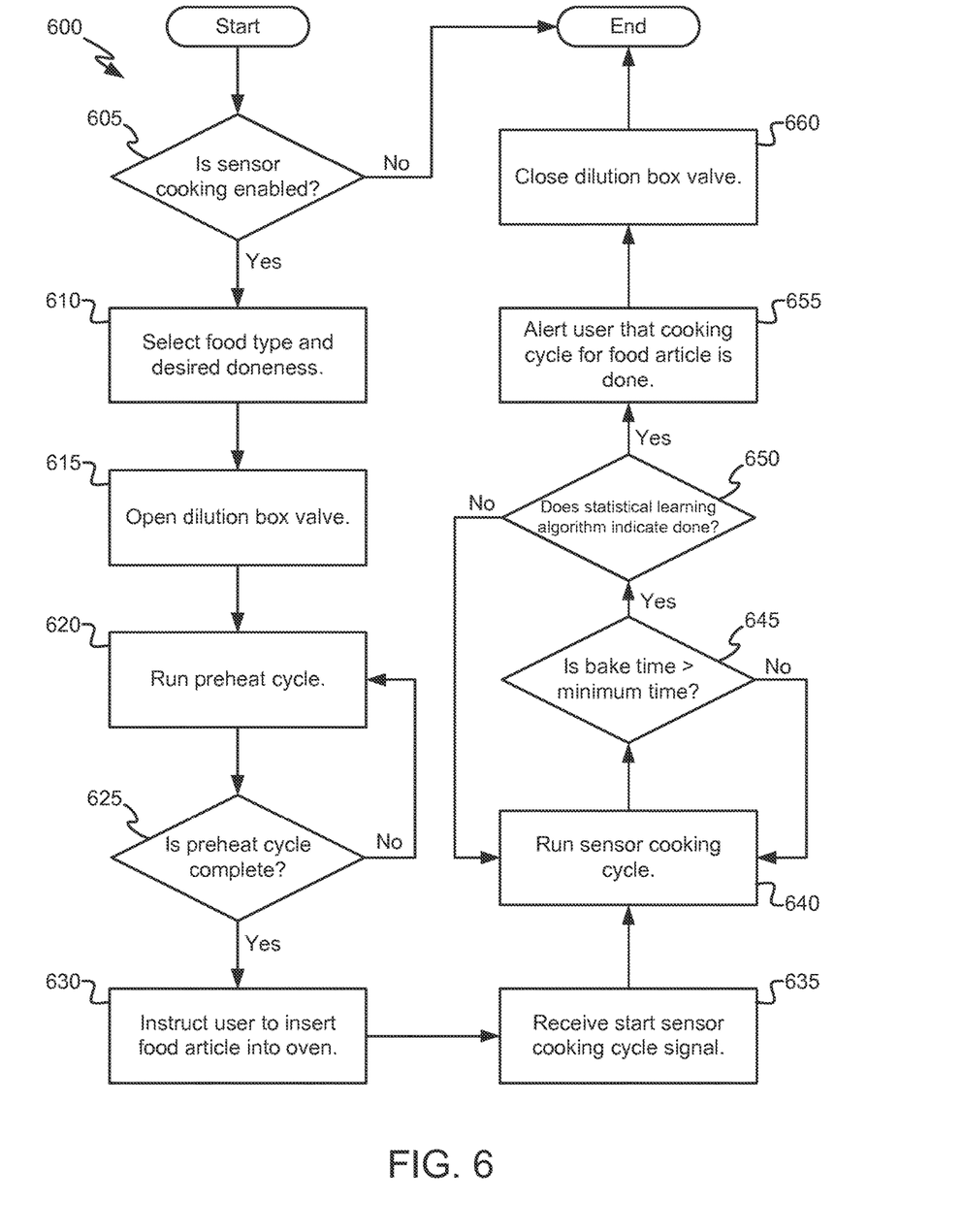
FIG. 6 illustrates a method for operating an oven appliance according to an exemplary embodiment of the present subject matter.

FIG. 6 illustrates a method 600 for operating an oven appliance according to an exemplary embodiment of the present subject matter. Method 600 may be utilized in or with any suitable oven appliance. For example, method 600 may be utilized in or with oven appliance 100. Thus, method 600 is discussed in greater detail below in the context of oven appliance 100. Controller 136 may be programmed or configured to implement method 600. Utilizing method 600, oven appliance 100 may cook a food item within cooking chamber 104 to a desired degree of doneness, as discussed in greater detail below.

At step 605, controller 136 determines whether sensor cooking is enabled. For example, a user may actuate controls 134 or other input on user interface 128 to enable a sensor cooking cycle prior to step 605, and user interface 128 may communicate with or signal controller 136 when the user actuates controls 134 or other input on user interface 128 corresponding to the sensor cooking cycle. When sensor cooking is disabled, oven appliance 100 may operate to heat cooking chamber 104, and the user may insert a food item into the cooking chamber 104 for a suitable period of time. Thus, oven appliance 100 may operate with timer cooking if sensor cooking is disabled at step 605. Conversely, if sensor cooking is enabled at step 605, method 600 proceeds to step 610.

At step 610, controller 136 receives a food type and/or a desired doneness for a food item during sensor cooking. As an example, a user may utilize controls 134 or other inputs on user interface 128 to communicate or signal controller 136 the food type and/or the desired doneness for the food item during sensor cooking at step 610. In particular, the user may select pizza, biscuits, cake, cookies, etc. as the food type and light, dark, etc. as the desired doneness with controls 134 or other inputs on user interface 128 at step 610. As another example, the user may communicate with or signal controller 136 with a separate computing device, such as a smartphone, tablet or personal computer, at step 610 to communicate or signal the food type and/or the desired doneness for the food item during sensor cooking at step 610. Thus, the food type and/or the desired doneness for the food item during sensor cooking may be established or determined at step 610.

At step 615, control valve 230 may be opened. Thus, ambient air $A_A$ may flow into dilution chamber 210 via ambient inlet 214 after step 615. Controller 134 may activate an actuator of control valve 230 at step 615 in order to open control valve 230, e.g., to a desired position for the food type selected or determined at step 610. Thus, control valve 230 may be opened any suitable amount at step 615, e.g., fully or partially. Control valve 230 may be closed prior to step 605 in order to limit or prevent contamination of fluid sensors 222 when oven appliance 100 and/or fluid analysis assembly 160 is inactive. However, in certain exemplary embodiments, fluid analysis assembly 160 may not include control valve 230. Thus, method 600 need not include step 615 in certain exemplary embodiments.

At step 620, controller 136 runs or activates a preheat cycle of oven appliance 100. During the preheat cycle, controller 136 operates top heating element 124 and/or bottom heating element 126 to heat cooking chamber 104 to a preselected temperature. Thus, method 600 may include receiving a cooking temperature selection prior to step 620. As an example, a user may input the cooking temperature selection at user interface 128 prior to step 620, and controller 136 may operate top heating element 124 and/or bottom heating element 126 to heat cooking chamber 104 to the cooking temperature selection at step 620. Thus, in certain exemplary embodiments, food items within cooking chamber 104 are cooked at a temperature selected by a user of oven appliance 100 during sensor cooking of method 600.

In alternative exemplary embodiments, the cooking temperature may be to a default cooking temperature corresponding to the food type identified at step 610.

At step 625, controller 136 determines when the preheat cycle of oven appliance 100 is complete. As an example, controller 136 may establish or determine that the preheat cycle of oven appliance 100 is completer when the temperature of cooking chamber 104 corresponds to the cooking temperature selection described above or another predetermined cooking temperature.

At step 630, controller 136 instructs a user of oven appliance 100 to insert a food item into the cooking chamber 104. As an example, the controller 136 may present an instruction on display 130 of user interface 128 and/or transmit a message to a smartphone, tablet or personal computer at step 630 to instruct the user of oven appliance 100 to insert the food item into the cooking chamber 104 at step 630.

In response to the instruction of step 630, a user places the food item into cooking chamber 104. The food item inserted into cooking chamber 104 at or after step 630 (e.g., preferably) corresponds to the food type selected or determined at step 610. Thus, the type of food item cooked during sensor cooking of method 600 is identified at step 610 in order to increase an accuracy and/or precision of a cooking doneness determination during subsequent steps of method 600. For example, if a pizza is cooked during method 600, pizza should be selected at step 610, and pizza should be inserted into cooking chamber 104 at or after step 630.

At step 635, controller 136 receives a start sensor cooking cycle signal. As an example, after inserting the food item into cooking chamber 104, the user may actuate controls 134 or other input on user interface 128 corresponding to the start sensor cooking cycle signal. In such a manner, method 600 may initiate or execute subsequent steps of method 600 after confirming with the user that the food item is disposed within cooking chamber 104.

At step 640, controller 136 initiates or runs a sensor cooking cycle. During the sensor cooking cycle, controller 136 may receive inputs or signals from fluid analysis assembly 160 in order to determine when the food item within cooking chamber 104 is cooked to the desired degree from step 610. Thus, e.g., controller 136 and/or fluid analysis assembly 160 may monitor gases or vapors from cooking chamber 104 during the sensor cooking cycle in order to determine when the food item in cooking chamber 104 is cooked. During the sensor cooking cycle, controller 136 may activate air handler 154 to draw cooking vapors or gases $A_C$ from cooking chamber 104 to fluid analysis assembly 160 and ambient air $A_A$ may flow into dilution chamber 210 via ambient inlet 214 in order to form the mixture $A_M$ of ambient air $A_A$ and cooking vapors or gases $A_C$ from cooking chamber 104 within dilution chamber 210 at fluid sensors 222 as described above.

At step 645, controller 136 determines whether a minimum cook time has elapsed during the sensor cooking cycle. Cooking the food item for at least the minimum cook time during the sensor cooking cycle may allow gas or vapor concentrations from cooking chamber 104 to increase and/or stabilize prior to measuring the gases or vapors from cooking chamber 104 with fluid analysis assembly 160 in subsequent steps of method 600. Thus, the minimum cook time may correspond to a period of time suitable for gas or vapor concentrations from cooking chamber 104 to approach measurable or regular levels. The minimum cook time may be any suitable period of time for particular food items. For example, the minimum cook time may be five minutes (e.g. for cookies), ten minutes (e.g. for bread), etc. If the minimum cook time has not elapsed at step 640, method 600 loops back to step 640. Conversely, method 600 proceeds to step 650 when the minimum cook time meets or exceeds a sensor cooking cycle bake time at step 645.

At step 650, controller 136 determines or establishes whether a machine or statistical learning algorithm indicates or signals that the food item within cooking chamber 104 has cooked to the desired doneness from step 610 during the sensor cooking cycle. Step 650 may correspond to or utilize method 500 described above to determine or establish whether the machine or statistical learning algorithm indicates or signals that the food item within cooking chamber 104 has cooked to the desired doneness from step 610 during the sensor cooking cycle. Thus, controller 136 may receive signals from fluid sensors 222 at step 650 and utilize the signals from fluid sensors 222 as inputs for the machine or statistical learning algorithm. The machine or statistical learning algorithm may output or establish a response pattern of fluid sensors 222, and controller 136 may determine the cooking status of the food item within cooking chamber 104 based upon the response pattern of fluid sensors 222 from the machine or statistical learning algorithm at step 650. If the machine or statistical learning algorithm does not indicate that the food item within cooking chamber 104 has cooked to the desired doneness, method 600 continues the sensor cooking cycle. Conversely, method 600 proceeds to step 655 when the machine or statistical learning algorithm indicates that the food item within cooking chamber 104 has cooked to the desired doneness.

At step 655, controller 136 activates an alert. Thus, method 500 includes activating an alert when the cooking status of the food item corresponds to the desired doneness from step 610 at step 650. Controller 136 may activate any suitable alert at step 655. For example, controller 136 may present a sensor cooking cycle completion message on display 130 of user interface 128 and/or transmit a message to a smartphone, tablet or personal computer at step 655 to alert the user of oven appliance 100 that the food item within cooking chamber 104 is cooked or at a pre-set desired degree of doneness or at a user-defined degree of doneness. The alert may also be activated to directly control parameters of oven appliance 100, e.g., lowering the set temperature of oven appliance 100 or turning off oven appliance 100. Additionally if the user does not respond to the alert, for example by opening door 108 or terminating the cook cycle, controller 136 may terminate the cooking cycle to prevent excessive cooking (e.g., burning) of the food item.

At step 660, control valve 230 may be closed. Thus, control valve 230 may block or limit ambient air $A_A$ from flowing into dilution chamber 210 via ambient inlet 214 after step 660. Controller 134 may activate an actuator of control valve 230 at step 660 in order to close control valve 230. Control valve 230 may be closed at step 660 in order to limit or prevent contamination of fluid sensors 222, e.g., when oven appliance 100 and/or fluid analysis assembly 160 is inactive. However, in certain exemplary embodiments, fluid analysis assembly 160 may not include control valve 230. Thus, method 600 need not include step 660 in certain exemplary embodiments.

Method 600 may also include cleaning fluid sensors 222, e.g., after step 650 and/or 660. Method 600 may clean fluid sensors 222 by heating fluid sensors 222 to a suitable temperature, e.g., with a heating element on or at probes of fluid sensors 222. In such a manner, performance of fluid sensors 222 over time may be improved and/or stabilized. In particular, contamination or deposition of vapors and/or gases on fluid sensors 222 may be limited or reduced by cleaning fluid sensors 222.

Utilizing method 600, cooking of a food item within cooking chamber 104 may be monitored with fluid analysis assembly 160 in order to determine when the food item within cooking chamber 104 is cooked to a desired degree. Thus, method 600 may assist with monitoring signals from fluid sensors 222 while fluid sensors 222 are exposed to gases or vapors from cooking chamber 104 in order to determine when the food item is cooked.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A method for monitoring cooking in an oven appliance, comprising:
   receiving a food item indication at a controller of the oven appliance;
   heating a food item within a cooking chamber of the oven appliance, the food item indication corresponding to a type of the food article within the cooking chamber;
   drawing cooking vapors or gases from the cooking chamber to a fluid analysis assembly of the oven appliance;
   opening a control valve of the fluid analysis assembly in order to mix ambient air about the fluid analysis assembly with the cooking vapors or gases from the cooking chamber, the control valve configured for adjusting ambient air flow in response to the food item indication;
   determining a cooking status of the food item within the cooking chamber with the controller of the oven appliance based upon a response pattern of a plurality of fluid sensors of the fluid analysis assembly to the mixture of ambient air and cooking vapors or gases;
   exposing the plurality of fluid sensors of the fluid analysis assembly to the mixture of ambient air and cooking vapors or gases, each fluid sensor of the plurality of fluid sensors generating a respective signal during said step of exposing, the respective signal from each fluid sensor of the plurality of fluid sensors corresponding to a different gas, vapor or combination of gases and vapors in the cooking vapors or gases;
   establishing the response pattern of the plurality of fluid sensors with a multivariate machine or statistical learning model at the controller of the oven appliance, the multivariate machine or statistical learning model comprising a linear discriminant analysis model, a partial least squares discriminant analysis model or a support vector machine; and
   activating an alert with the controller of the oven appliance when the cooking status of the food item within the cooking chamber is a done cooking status.

2. The method of claim 1, further comprising receiving a cooking temperature for the oven appliance at the controller of the oven appliance prior to said step of heating the food item within the cooking chamber.

3. The method of claim 1, wherein said step of receiving the food item indication further comprises receiving the food item indication and a desired doneness for the food item at the controller of the oven appliance.

4. The method of claim 1, further comprising activating a food item placement request with the controller of the oven appliance after a preheat cycle of the oven appliance and prior to said step of heating the food item.

5. The method of claim 1, further comprising receiving a gas or vapor analysis cooking cycle activation at the controller of the appliance prior to said step of receiving the food item indication.

6. The method of claim 1, wherein the plurality of fluid sensors comprises at least three fluid sensors and the fluid sensors of the plurality of fluid sensors comprise metal oxide semiconductor sensors.

7. The method of claim 1, further comprising activating a heating element at the fluid sensors of the plurality of fluid sensors in order to clean the fluid sensors of the plurality of fluid sensors.

8. A method for monitoring cooking in an oven appliance, comprising:
   initiating a gas or vapor analysis cooking cycle of the oven appliance;
   operating a heating element of the oven appliance in order to preheat a cooking chamber of the oven appliance to a selected cooking temperature during the gas or vapor analysis cooking cycle;
   activating a food item placement request with the controller of the oven appliance after the cooking chamber of the oven appliance is preheated to the selected cooking temperature;
   drawing cooking vapors or gases from the cooking chamber to a fluid analysis assembly of the oven appliance after a food item is positioned within the cooking chamber during the gas or vapor analysis cooking cycle;
   opening a control valve of the fluid analysis assembly in order to mix ambient air about the fluid analysis assembly with the cooking vapors or gases from the cooking chamber, the control valve configured for adjusting ambient air flow in response to the food item indication;
   determining a cooking status of the food item within the cooking chamber with the controller of the oven appliance based upon a response pattern of a plurality of fluid sensors of the fluid analysis assembly to the mixture of ambient air and cooking vapors or gases during the gas or vapor analysis cooking cycle;
   exposing the plurality of fluid sensors of the fluid analysis assembly to the mixture of ambient air and cooking vapors or gases, each fluid sensor of the plurality of fluid sensors generating a respective signal during said step of exposing, the respective signal from each fluid sensor of the plurality of fluid sensors corresponding to a different gas, vapor or combination of gases and vapors in the cooking vapors or gases;
   establishing the response pattern of the plurality of fluid sensors with a multivariate machine or statistical learning model at the controller of the oven appliance, the multivariate machine or statistical learning model comprising a linear discriminant analysis model, a partial least squares discriminant analysis model or a support vector machine; and
   activating an alert with the controller of the oven appliance when the cooking status of the food item within the cooking chamber is a selected cooking status.

9. The method of claim 8, further comprising receiving the selected cooking temperature and the selected cooking status at the controller of the oven appliance prior to said step of determining the cooking status.

10. The method of claim 8, further comprising receiving a gas or vapor analysis cooking cycle activation at the controller of the appliance prior to said step of initiating the gas or vapor analysis cooking cycle.

11. The method of claim 8, wherein the plurality of fluid sensors comprises at least three fluid sensors and the fluid sensors of the plurality of fluid sensors comprise metal oxide semiconductor sensors.

12. The method of claim 8, wherein said step of activating the alert comprises transmitting a gas or vapor analysis cooking cycle completion message to a mobile device.

13. The method of claim 8, further comprising activating a heating element at the fluid sensors of the plurality of fluid sensors in order to clean the fluid sensors of the plurality of fluid sensors.

* * * * *